United States Patent [19]

Howard

[11] 4,088,094

[45] May 9, 1978

[54] TREAD DRUM FOR ANIMALS

[75] Inventor: Wayne H. Howard, Menlo Park, Calif.

[73] Assignee: The United States of America as represented by the Administrator of the National Aeronautics and Space Administration, Washington, D.C.

[21] Appl. No.: 672,223

[22] Filed: Mar. 31, 1976

[51] Int. Cl.² .............................................. A01K 15/00
[52] U.S. Cl. ..................................................... 119/29
[58] Field of Search ................ 119/29, 1, 15; 272/115

[56] References Cited

U.S. PATENT DOCUMENTS

| 2,663,282 | 12/1953 | Ingle | 119/29 |
| 3,057,328 | 10/1962 | Swartz | 119/29 |

*Primary Examiner*—Jay N. Eskovitz
*Attorney, Agent, or Firm*—Darrell G. Brekke; John R. Manning

[57] ABSTRACT

A tread drum for animals, such as primates, includes a cylindrical housing mounted for rotation about a horizontal axis of revolution and having a cylindrical treadway portion on which the animal treads while the drum is rotated by means of a motorized drive. The treadway portion of the drum includes an electrode structure incorporated therein, with sectors thereof being independently energizable by means of a commutator and source of potential so that an electrical shock station is created behind a running-in-place station on the moving treadway. In this manner, if the animal should fall behind its running-in-place station, it may be shocked by treading on the energized electrode structure. One end of the tread drum comprises a transparent wall for unobstructed viewing of the animal being exercised.

9 Claims, 7 Drawing Figures

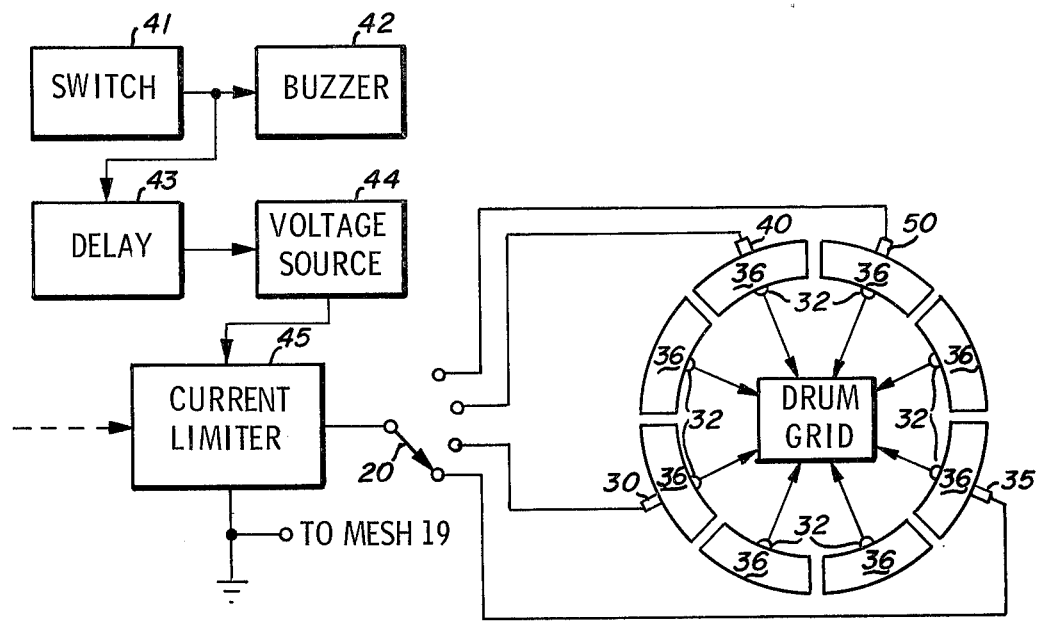
Fig_6
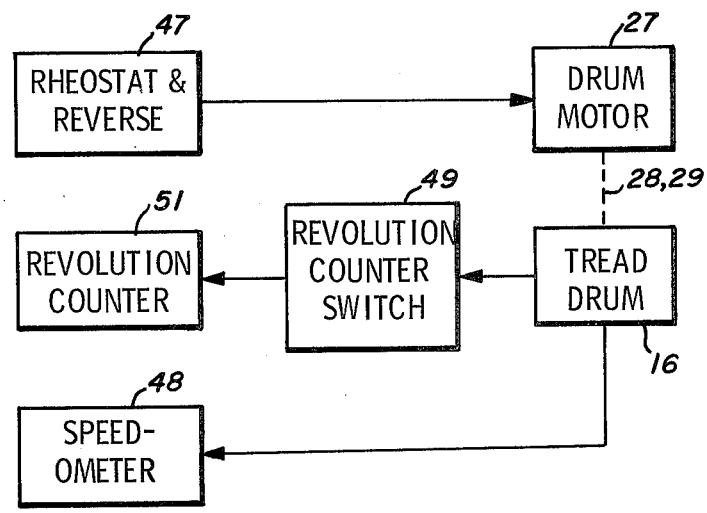
Fig_7

TREAD DRUM FOR ANIMALS

The invention described herein was made by an employee of the United States Government and may be manufactured and used by or for the Government for governmental purposes without the payment of any royalties thereon or therefore.

BACKGROUND OF THE INVENTION

The present invention relates in general to treadwheels for animals and more particularly to a tread drum particularly useful for primates and incorporating a selectively energizable electric shock station.

DESCRIPTION OF THE PRIOR ART

Heretofore, tread drums have been proposed for exercising animals. In one prior art tread drum, as exemplified by U.S. Pat. No. 3,057,328 issued Oct. 9, 1962, the treadway of the drum was formed by an electrode structure which could be selectively energized with an electrical potential for imparting an electrical shock to the animal running on the cylindrical treadway. The end walls of the drum were made of a transparent plastic for observation of the animal. The animal's reaction to the electrical shock was observed through the transparent end walls.

In this prior art device, the entire treadway was energized with the electrical shock potential. Stationary brushes riding on slip rings on one of the ends of the drum were utilized for transmitting the shock potential to the electrodes of the treadway. While such an arrangement may be suitable for observing the reaction of mice and other animals to electrical shock, it is desirable for certain studies on the stress in primates and larger animals to provide a tread drum in which only a selected portion of the treadway can be energized with the potential to create an electrical shock station down track from a running-in-place station so that the animal under observation can be taught to run continuously in the running-in-place position at the speed of the treadway.

SUMMARY OF THE PRESENT INVENTION

The principal object of the present invention is the provision of an improved thread drum for animals and more particularly to such a drum including the provision of an electrical shock station disposed down track from a running-in-place station.

In one feature of the present invention, the treadway of an animal tread drum includes an electrode structure for imparting an electrical shock to the animal, such electrode structure being selectively energizable only in a predetermined shock station region while the treadway is in motion, whereby an electrical shock is imparted to the animal when the animal falls behind its running-in-place station on the moving treadway.

In another feature of the present invention, a commutator is employed for applying the electrical shock potential to the selectively energizable shock station of the moving treadway.

In another feature of the present invention, a motorized drive is coupled to the tread drum for rotating the tread drum at a predetermined angular velocity.

Other features and advantages of the present invention become apparent upon perusal of the following specification taken in connection with the accompanying drawings wherein:

BRIEF DESCRIPTION OF DRAWINGS

FIG. 6 is a schematic diagram, in block diagram form, of the shock training electronics for the tread drum of the present invention, and FIG. 7 is a schematic block diagram of the drum rotation control for the tread drum of the present invention.

DESCRIPTION OF THE PREFERRED EMBODIMENTS

Figure 1:
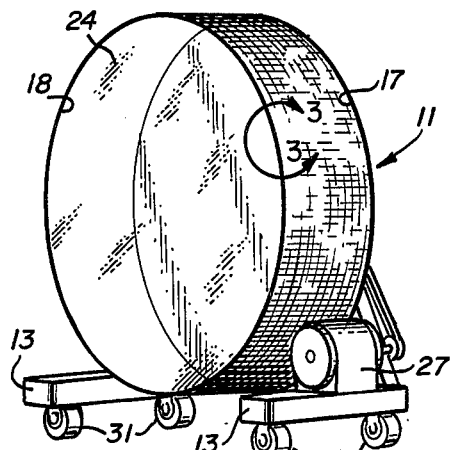
FIG. 1 is a front perspective view of an animal tread drum incorporating features of the present invention.
Figure 2:
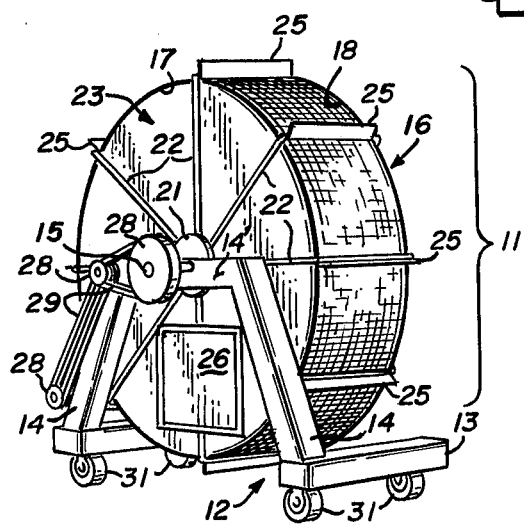
FIG. 2 is a back perspective view of the tread drum of FIG. 1.

Referring now to FIGS. 1 and 2, there is shown the tread drum 11 of the present invention. The tread drum 11 includes a stand 12 having a pair of horizontally directed foot portions 13 which are interconnected by means of a generally vertically direct inverted U-shaped leg structure 14. The top of the inverted U-shaped leg structure 14 is centrally bored to receive a bearing assembly which in turn receives, in supportive rotational engagement, a horizontally directed axle 15 fixedly secured to a drum-shaped housing 16. The drum-shaped housing 16 includes a pair of axially spaced rings 17 and 18 having a cylindrical stainless steel mesh 19 affixed therebetween to form a cylindrical treadway of the tread drum housing 16.

Ring 17 is affixed to the axle 15 via the intermediary of a centrally disposed hub 21 and a plurality of radially directed spokes 22. The end of the drum 16, which includes the spokes 22, is closed off via the intermediary of a disk-shaped metallic end wall portion 23. The opposite or front end of the cylindrical drum-shaped housing 16 is closed off by means of a transparent sheet of material such as a disk of plexiglass 24. A plurality of strengthening ribs 25 extend axially between the rings 17 and 18 on the outside of the mesh treadway 19 at the ends of the spokes 22. A sliding access door 26 is provided in the sheet metal closing wall 23 to permit ingress and egress of animals to and from the drum 16.

The drum 16 is rotationally driven by a motor 27 carried on one of the foot members 13 of the stand 12. The output shaft of the motor is coupled to the axle 15 of the drum 16 via the intermediary of a plurality of pulleys and drive belts 28 and 29 respectively. Four wheels 31 are affixed to the horizontal feet 13 of the stand 12 to facilitate movement of the tread drum 11.

Figure 3:
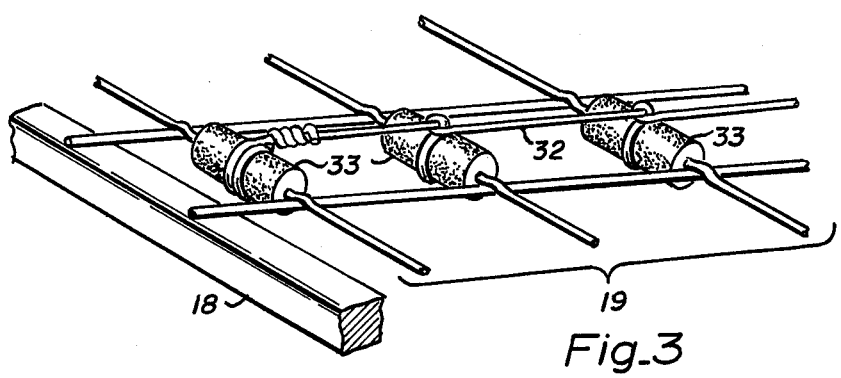
FIG. 3 is an enlarged detail view of a portion of the structure of FIG. 1 delineated by line 3—3.

Referring now to FIG. 3, the treadway 19 includes an electrode structure incorporated therein for imparting an electrical shock to the animal treading on the treadway 19. More particularly, 14 to 16 guage bare bus wire 32 is carried from the mesh 19 via the intermediary of longitudinally split tubular insulator members 33, as of rubber. The bare wire 32 is tied around each of the insulators 33. The circumferential spacing of the axially directed bus wire 32 is arranged so that a foot of the animal will contact one of the bare shock electrode wires 32 and an adjacent bare wire of the mesh 19 which is operated at ground potential. In a typical example for a primate tread drum 16, the stainless steel mesh 19 is a one-inch mesh and every other row of mesh elements includes an electrode 32.

Figure 5:
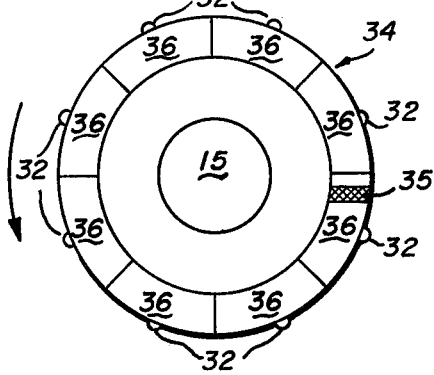
FIG. 5 is a schematic line diagram of the commutator employed for applying the electrical potential to the shock station in the tread drum of FIG. 4.

The cylindrical treadway 19 is divided into a plurality of circumferentially spaced sectors, such as eight sectors each of 45° peripheral extent and the electrode wires 32 in each sector are connected together for separately energizing each sector. The eight wires coupling to the separate eight sectors are then brought out to a commutator structure 34 as shown in FIG. 5. The commutator 34 is carried at the hub 21 and is fixedly secured to rotate with the tread drum 16. A brush assembly 35 is disposed adjacent the commutator sectors 36 of the commutator 34 and in axially spaced relation therefrom for riding on a circular track comprising a circular array of individual commutator sectors 36.

The fixed brush assembly 35 is conductively connected to a source of electrical potential sufficient to provide an electrical shock to the animal under observation. The stationary brush 35 serves to sequentially energize the respective sectors of the electrode wire 32 when each of the commutator sectors 36 rotates into the position of the brush 35.

Figure 4:
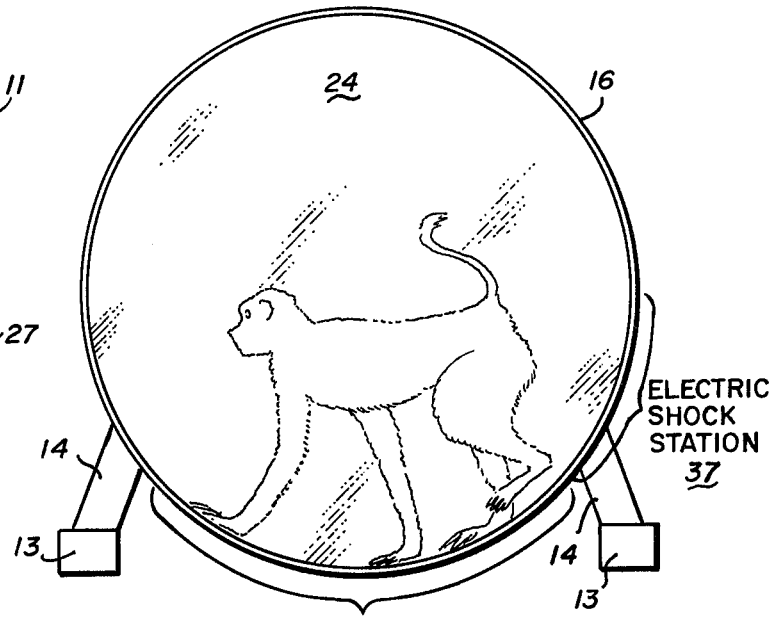
FIG. 4 is a schematic line diagram of the tread drum of the present invention depicting its mode of operation.

Referring now to FIG. 4, there is shown a preferred embodiment of the present invention wherein the brush 35 is positioned relative to the commutator sectors 36 so that only the particular sector of the electrode structure which corresponds to an electrical shock station region 37 will be energized. The electrical shock station 37 is preferably located down track from a running-in-place station 38 so that as the animal tires or begins to fall behind the running-in-place station 38, the operator may actuate the electrical shock station 37 to impart an electrical shock to the animal, thereby causing the animal to speed up its movements and return to the running-in-place station 38. It is also desirable to have a buzzer associated with activation of the electrical shock station 38 so that the animal is conditioned audibly to return to the running-in-place station merely by activation of the buzzer.

As an alternative to the sector commutator having a relatively few number of sectors 36, as shown in FIG. 5, the commutator 34 may comprise a circular array of the ends of the individual electrode wires 32. The brush 35 would be increased in circumferential extent so that electrical contact is made from the brush 35 to ⅛th of the number of exposed conductors 32 so as to energize an equivalent sector of the treadway within the electrical shock station 37. The position of the stationary brush 35 would determine the position of the shock station 37.

Referring now to FIG. 6, there is shown a block diagram of the shock training electronics utilized with the tread drum 11 of FIGS. 1–5. More particularly, the operator, when the animal falls behind the running-in-place station 38, actuatues a switch 41 which energizes a buzzer 42. After a short delay provided by delay 42, the output of the switch energizes a source of shocking potential 44 which is thence fed through a current limiter 45 and selector switch 20 via cable to the commutator brush 35 and thence via the commutator 34 to the selector of electrode wires 32 which is disposed within the electrical shock station 37.

During experiments with a primate in the tread drum 11, the primate is normally visually monitored with a TV camera. Sometimes the left profile is desired and sometimes the right profile is desired (depending on location of body sensors, etc.). The drum motor 27 is reversible. When the direction of rotation is changed, the electric shock sector is relocated. More particularly, when the drum is turned clockwise, the shock station 37 extends from 90 to 135 degrees. When the drum is turned counterclockwise the shock station 37 is moved to the 225°–270° segment. Four fixed-position brushes 30, 35, 40 and 50 can be individually selected by selection switch 20 to energize one brush at a time. After a test is conducted, the primate sometimes remains in the top of the drum and refuses to leave the drum. It is dangerous for an animal handler to reach through door 26 and try to forcibly remove the primate. Brushes 40 and 50 enable the upper regions of the drum 16 to become shock stations 37.

Referring now to FIG. 7, there is shown a block diagram of the drum roation control circuitry. More particularly, a rheostat and reverse polarity switch assembly 47 operated by the operator controls the flow of power to the drum motor 27 for controlling the angular velocity of the tread drum 16 as driven from the motor 27 via the pulley and belt drive 28 and 29. The velocity of the tread drum 16 is reused and the reused output fed to a speedometer 48 to allow the operator to control the angular velocity of the tread drum by adjusting the rheostat 47 in accordance with the reading of the speedometer 48. In addition, a total count of the revolution of the tread drum 16 is obtained by means of a revolution counting switch 49 which is coupled to the tread drum for deriving an output for each revolution. The output of the switch is fed to a revolution counter 51 for displaying the total revolutions to the operator.

The advantage of the tread drum 11 of the present invention over that of the aforecited U.S. Pat. No. 3,057,328 is that only a selected portion, namely, the electric shock station 37 of the treadway 19 is energized with the electrical potential so that the animal is shocked only when the animal falls behind its running-in-place station. The advantage of this feature is that it greatly reduces the training time required to train the animal to remain in the running-in-place station irrespective of the angular velocity of the treadway.

What is claimed is:

1. In a tread drum for animals: housing means for rotation about an axis of revolution and dimensioned to contain therewithin an animal to be exercised, said housing means having a closed treadway portion on which the animal is to tread while said housing means and said treadway portion rotate about said axis of revolution;

said treadway having a plurality of electrodes capable of applying an electrical shock to an animal treading thereon when said electrodes are energized;

means for enabling, at a selected time, the selective energization of that portion of said electrodes that are located in a shock station region, said shock station region being immobile and behind a running-in-place region of said treadway whereby said animal can be shocked if it should fall behind said running-in-place region of said treadway.

2. The apparatus of claim 1 including motor means coupled to said housing means for rotating said housing means.

3. The apparatus of claim 1 wherein said means for enabling selective energization includes commutator means for applying an energizing electrical potential derived from a stationary source of electrical potential to said electrodes located in said shock station region of said rotatable treadway.

4. The apparatus of claim 1 wherein at least one wall of said housing means it is made of a transparent material for generally unobstructed viewing of the animal while the tread drum is in use.

5. The apparatus of claim 1 wherein said housing means includes a pair of disk-shaped axially spaced walls enclosed by a circular wall portion, and wherein said axis of revolution of said housing means is coaxial with the axis of revolution of said circular wall portion.

6. The apparatus of claim 5 wherein said treadway portion includes said circular wall portion of said housing means.

7. The apparatus of claim 6 including door means provided in one of said disk-shaped walls for providing means of ingress and egress to and from said housing means for the animal.

8. The apparatus of claim 2 including means for controlling the angular velocity of said housing means as driven by said motor means.

9. The apparatus of claim 1 wherein said means for enabling selective energization includes means for sounding an alarm audible to said animal a predetermined period before said shock station region electrodes are energized.

* * * * *